United States Patent
Navon et al.

(10) Patent No.: US 12,045,473 B2
(45) Date of Patent: Jul. 23, 2024

(54) DATA STORAGE DEVICE AND METHOD FOR PREDICTION-BASED IMPROVED POWER-LOSS HANDLING

(71) Applicant: Western Digital Technologies, Inc., San Jose, CA (US)

(72) Inventors: Ariel Navon, Revava (IL); Shay Benisty, Beer Sheva (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 58 days.

(21) Appl. No.: 17/839,615

(22) Filed: Jun. 14, 2022

(65) Prior Publication Data
US 2023/0400991 A1 Dec. 14, 2023

(51) Int. Cl.
*G06F 12/00* (2006.01)
*G06F 3/06* (2006.01)
*G06F 13/00* (2006.01)

(52) U.S. Cl.
CPC .......... *G06F 3/0625* (2013.01); *G06F 3/0607* (2013.01); *G06F 3/0659* (2013.01); *G06F 3/0679* (2013.01)

(58) Field of Classification Search
CPC .... G06F 3/0625; G06F 3/0607; G06F 3/0659; G06F 3/0679
USPC ........................................................ 711/154
See application file for complete search history.

(56) References Cited

U.S. PATENT DOCUMENTS

| | | | | |
|---|---|---|---|---|
| 6,614,708 | B1 * | 9/2003 | Lin | G11C 5/141 365/228 |
| 7,996,579 | B2 * | 8/2011 | Hahn | G06F 13/4081 710/72 |
| 8,816,875 | B2 * | 8/2014 | Hiramatsu | G01K 13/20 340/687 |
| 9,052,758 | B2 * | 6/2015 | Walker | G06F 3/038 |
| 9,817,688 | B2 * | 11/2017 | Kaplan | G06F 11/3452 |
| 10,048,996 | B1 * | 8/2018 | Bell | G06F 11/3006 |
| 11,136,008 | B2 * | 10/2021 | Lai | B60L 53/305 |
| 11,294,097 | B1 * | 4/2022 | Tong | H02H 9/005 |
| 2002/0094028 | A1 * | 7/2002 | Kimoto | H04N 19/107 375/E7.176 |
| 2003/0210601 | A1 * | 11/2003 | Lin | G11C 16/30 365/229 |

(Continued)

OTHER PUBLICATIONS

U.S. Appl. No. 17/542,815, filed Dec. 6, 2021 entitled "Data Storage Device and Method for Preventing Data Loss During an Ungraceful Shutdown."

*Primary Examiner* — Sheng Jen Tsai
(74) *Attorney, Agent, or Firm* — Crowell & Moring LLP

(57) ABSTRACT

A data storage device and method for prediction-based improved power-loss handling. In one embodiment, a data storage device is provided comprising a memory and a controller. The controller is configured to predict a probability of an ungraceful shutdown of the data storage device; determine whether the probability is greater than a threshold; and in response to determining that the probability is greater than the threshold, reduce a risk of data loss that would occur in response to the ungraceful shutdown of the data storage device. Other embodiments are possible, and each of the embodiments can be used alone or together in combination.

20 Claims, 6 Drawing Sheets

(56) References Cited

U.S. PATENT DOCUMENTS

| | | | |
|---|---|---|---|
| 2004/0174926 A1* | 9/2004 | Shinde | H04W 52/08 375/141 |
| 2004/0183691 A1* | 9/2004 | Lin | G08C 17/00 340/12.22 |
| 2005/0207241 A1* | 9/2005 | Deng | G06F 21/78 365/200 |
| 2008/0227444 A1* | 9/2008 | Salomone | H04L 65/80 455/419 |
| 2011/0144818 A1* | 6/2011 | Li | G06F 1/26 700/291 |
| 2012/0170435 A1* | 7/2012 | Trantham | G11B 27/36 369/53.42 |
| 2014/0075252 A1* | 3/2014 | Luo | G11C 11/5635 714/721 |
| 2015/0264644 A1* | 9/2015 | Kamijoh | H04W 64/00 455/424 |
| 2015/0286519 A1* | 10/2015 | Huang | G06F 11/0709 714/47.3 |
| 2016/0187910 A1* | 6/2016 | Moreno | G06Q 50/06 700/297 |
| 2016/0295522 A1* | 10/2016 | Qin | H04W 52/28 |
| 2016/0321115 A1* | 11/2016 | Thorpe | G06F 11/3452 |
| 2016/0370233 A1* | 12/2016 | Son | G01K 7/01 |
| 2017/0163716 A1* | 6/2017 | Jang | H04L 69/40 |
| 2019/0004948 A1* | 1/2019 | Prasad | G06F 3/0647 |
| 2019/0098432 A1* | 3/2019 | Carlson | H04W 4/70 |
| 2019/0334353 A1* | 10/2019 | Solomon | G06F 1/263 |
| 2020/0090093 A1* | 3/2020 | Bianchi | G06N 3/08 |
| 2020/0159601 A1* | 5/2020 | Asmussen | G06N 5/01 |
| 2021/0021533 A1* | 1/2021 | Guim Bernat | H04W 4/029 |
| 2021/0089225 A1* | 3/2021 | Boyd | G06F 3/0679 |
| 2022/0066527 A1* | 3/2022 | Liang | G06F 11/1441 |
| 2022/0189579 A1* | 6/2022 | Si | G16B 40/20 |
| 2022/0261457 A1* | 8/2022 | Dang | G06F 17/18 |
| 2022/0309513 A1* | 9/2022 | Shinar | G06Q 40/08 |
| 2022/0415403 A1* | 12/2022 | Bhat | G06F 3/0659 |
| 2023/0061649 A1* | 3/2023 | Armstrong | A63F 13/26 |
| 2023/0094216 A1* | 3/2023 | Diamond | G06N 3/0442 700/291 |
| 2023/0297464 A1* | 9/2023 | Tan | G06F 11/073 714/2 |

* cited by examiner

DATA STORAGE DEVICE AND METHOD FOR PREDICTION-BASED IMPROVED POWER-LOSS HANDLING

BACKGROUND

A sudden loss of power from a host to a data storage device can cause host data placed in the data storage device's write cache buffer to be lost and can also disturb background operations of the data storage device's firmware. Power-loss-prevention (PLP) data storage devices can protect against such ungraceful shutdown (UGSD) situations. For example, a PLP data storage device can include large capacitors that store enough power to allow the data storage device to postpone shutting down until necessary internal operations are completed. A PLP data storage device can also utilize DRAM for data caching.

DETAILED DESCRIPTION

Overview

Figure 1A:
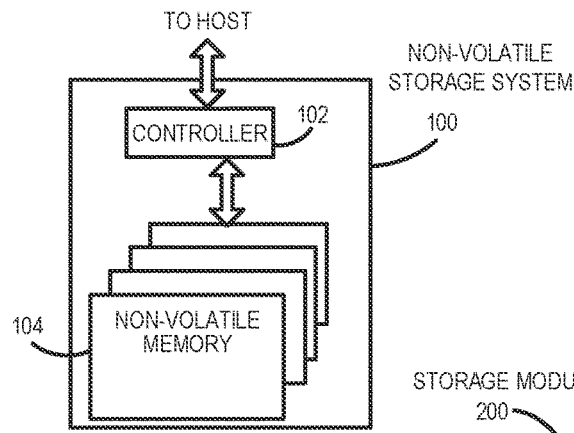
FIG. 1A is a block diagram of a data storage device of an embodiment.

By way of introduction, the below embodiments relate to a data storage device and method for prediction-based improved power-loss handling. In one embodiment, a data storage device is provided comprising a memory and a controller. The controller is configured to predict a probability of an ungraceful shutdown of the data storage device; determine whether the probability is greater than a threshold; and in response to determining that the probability is greater than the threshold, reduce a risk of data loss that would occur in response to the ungraceful shutdown of the data storage device.

In some embodiments, the controller is further configured to use a machine-learning prediction model to predict the probability.

In some embodiments, at least one of the following is used as an input to the machine-learning prediction model: a number of random/sequential read/write/flush commands, command length, utilization of command queues, power consumption, single-root-input-output-virtualization (SRIOV) information, failure reporting, link stability information, temperature excursions, failure notification, and host unmounts.

In some embodiments, the data storage device stores a plurality of machine-learning prediction models and the controller is further configured to select the machine-learning prediction model from the plurality of machine-learning prediction models.

In some embodiments, the controller is further configured to update the machine-learning prediction model.

In some embodiments, the controller is further configured to reduce the risk of data loss by performing at least one of the following: flushing a cache, flushing an internal table, limiting a cache size, limiting a number of outstanding pending commands, limiting a number of internal operations, and avoiding sending a completion message to a host before writing data to the memory.

In some embodiments, the controller is further configured to compare the probability against a plurality of thresholds and select one of a plurality of actions to take to reduce the risk of data loss based on the comparison.

In some embodiments, the data storage device further comprises a capacitor configured to provide the data storage device with power in response to the ungraceful shutdown of the data storage device.

In some embodiments, the data storage device comprises a universal serial bus (USB) device.

In some embodiments, the memory comprises a three-dimensional memory.

In another embodiment, a method is provided that is performed in a data storage device comprising a memory. The method comprises generating a prediction score of an ungraceful shutdown of the data storage device; determining whether the prediction score is greater than a threshold; and in response to determining that the prediction score is greater than the threshold, limiting an amount of data at risk of loss when power is removed from the data storage device.

In some embodiments, the prediction score is generated using a machine-learning prediction model.

In some embodiments, at least one of the following is used as an input to the machine-learning prediction model: a number of randomisequential read/write/flush commands, command length, utilization of command queues, power consumption, single-root-input-output-virtualization (SRIOV) information, failure reporting, link stability information, temperature excursions, failure notification, and host unmounts.

In some embodiments, the method further comprises selecting the machine-learning prediction model from a plurality of machine-learning prediction models.

In some embodiments, the method further comprises updating the machine-learning prediction model.

In some embodiments, limiting the amount of data at risk of loss comprises at least one of the following: flushing a cache, flushing an internal table, limiting a cache size, limiting a number of outstanding pending commands, limiting a number of internal operations, and avoiding sending a completion message to a host before writing data to the memory.

In some embodiments, the method further comprises comparing the prediction score against a plurality of thresholds and select one of a plurality of actions to take to limit the amount of data at risk of loss based on the comparison.

In some embodiments, the data storage device further comprises a capacitor configured to provide the data storage device with power in response to the ungraceful shutdown of the data storage device.

In some embodiments, the data storage device comprising a universal serial bus (USB) device.

In another embodiment, a data storage device is provided comprising a memory; means for predicting a probability of an ungraceful shutdown of the data storage device; and means for limiting an amount of data loss that would occur during the ungraceful shutdown in response to the probability being greater than a threshold.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
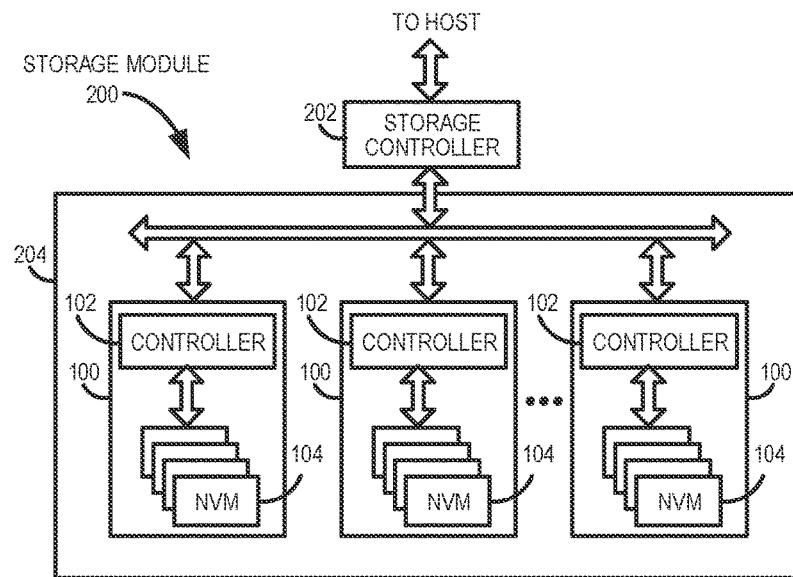
FIG. 1B is a block diagram illustrating a storage module of an embodiment.
Figure 1C:
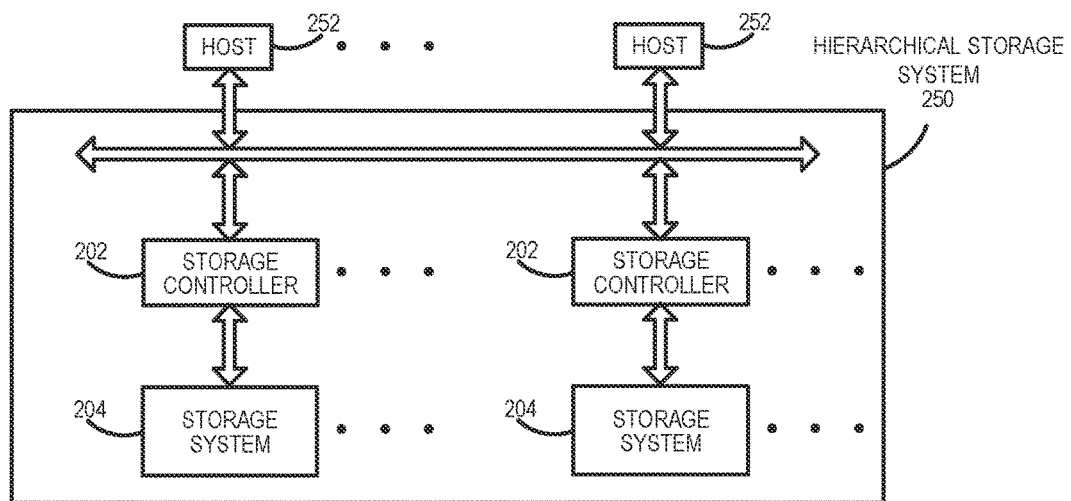
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed.

Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
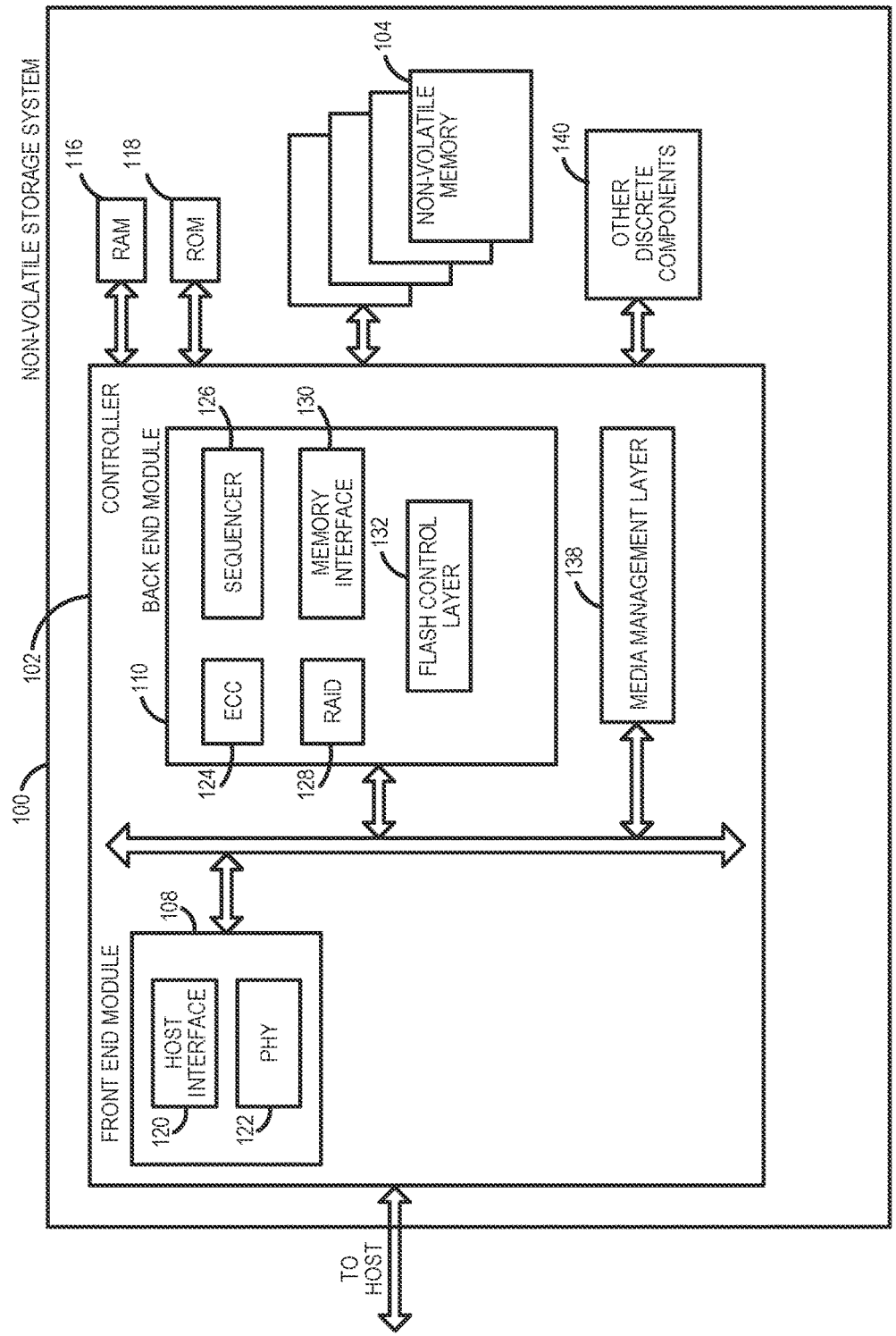
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data, The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
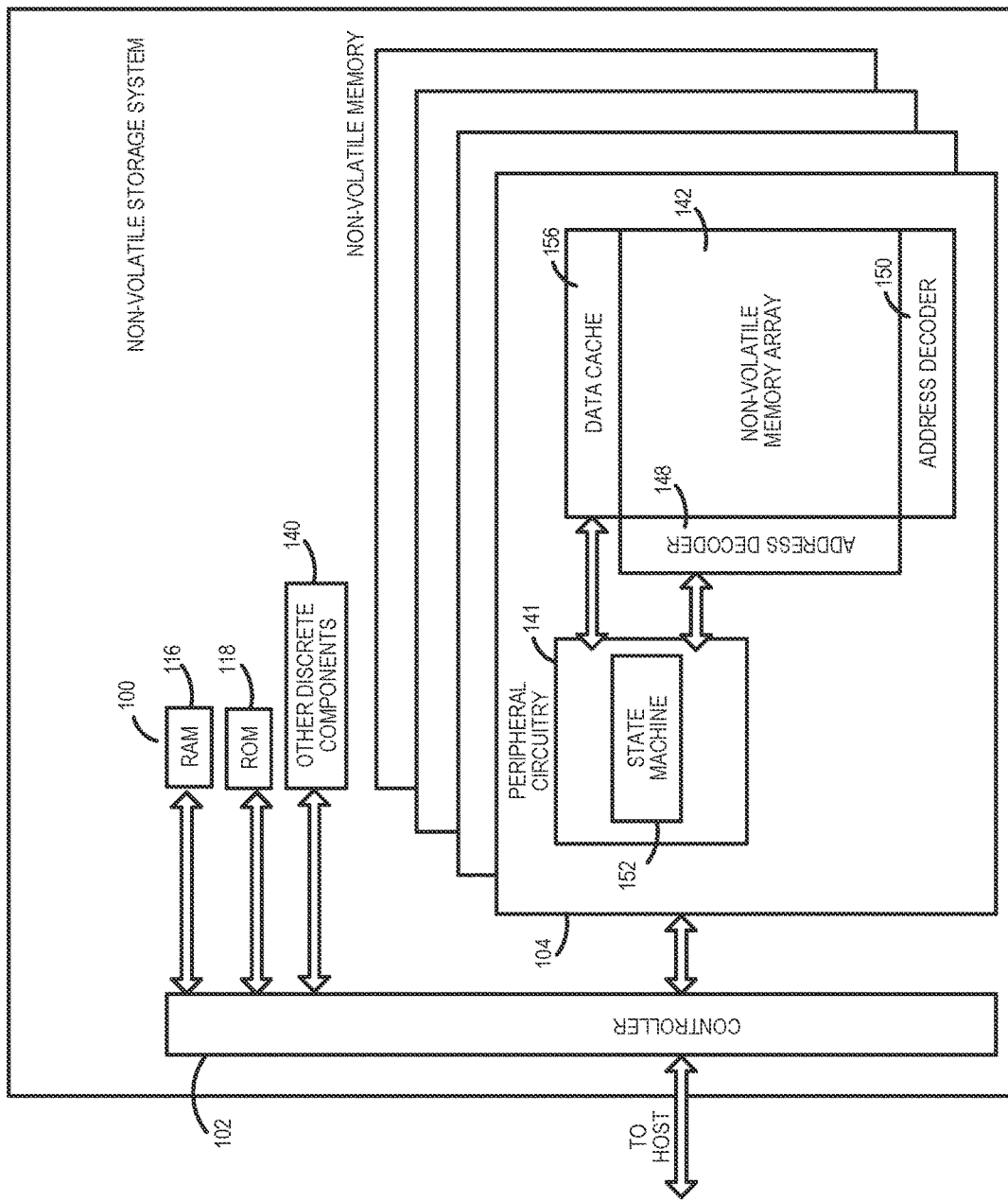
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
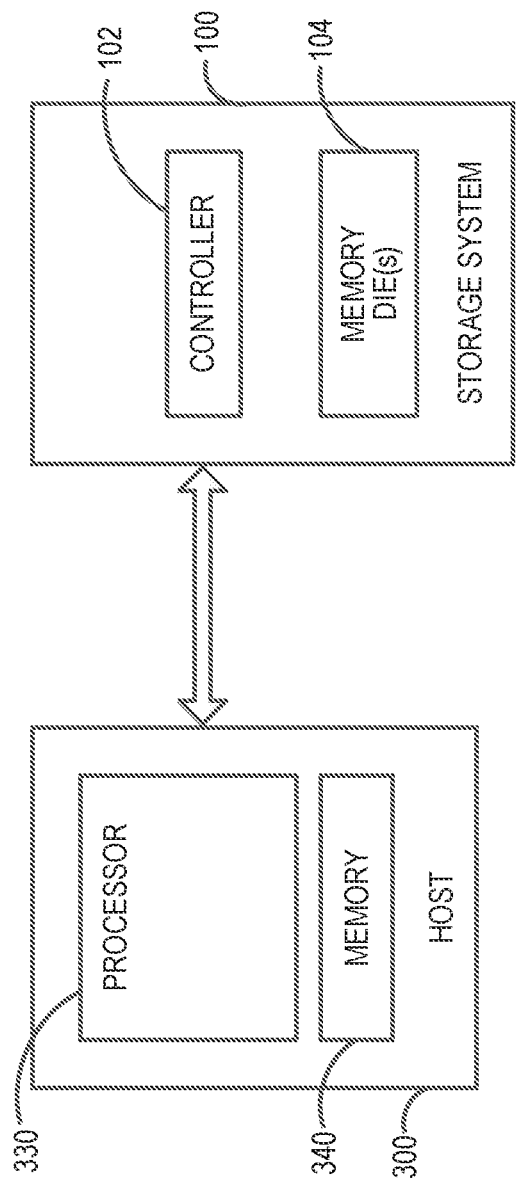
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, a sudden loss of power from a host to a data storage device can cause host data placed in the data storage device's write cache buffer to be lost and can also disturb background operations of the data storage device's firmware. Power-loss-prevention (PLP) data storage devices can protect against such ungraceful shutdown (UGSD) situations. For example, a PLP data storage device can include large capacitors that store enough power to allow the data storage device to postpone shutting down until necessary internal operations are completed. A PLP data storage device can also utilize DRAM for data caching. Both of these mechanisms can be problematic from cost and complexity perspectives.

The following embodiments recognize that, in many cases, data storage device decommissioning is a predictable event, preceded by a failure notification, a host unmount, or some other type of warning. While an enterprise data storage device is still required to support an unscheduled and sudden loss of power, capacitor size and data storage device footprint may be improved if the data storage device can predict its own potential power loss and defensively commit key metadata in advance of a high-probability disconnection event. Together with well-known host-side solutions, such as power disable or power loss notification, this can reduce the overall cost of PLP-enabled data storage devices. Thus, using a method for prediction-based improved power-loss handling can reduce the required utilization of typical PLP resources by being able to provide an "in-advance alert" that an expected power-down scenario is approaching. That is, by providing an expected estimation for a UGSD scenario (optionally coupled with a probability measure), these embodiments can be used to reduce the cache size and temporal copies of logical-to-physical (L2P) address table entries, as well as allow reduction of the back-up capacitors inside the data storage device.

These embodiments can be used in any suitable situation, including, but not limited to, PLP data storage devices and enterprise applications, such as servers and datacenters. Also, these embodiments can be used instead of or in addition to other types of UGSD recovery measures (e.g., large capacitors, etc.). When used with other types of UGSD recovery measures, these embodiments can result in those other types of UGSD recovery measures being used less often (such that the data storage device can guarantee user data commit regardless of prediction hit-rate). In case of prediction miss, the (rare) worst-case result can be expressed in longer boot time, but frequent usage of UGSD-prediction can result in the need for smaller capacitors and/or can reduce risk in write-through mode.

The UGSD-prediction mechanism can be based on classical machine-learning (ML) methods, including classification models (e.g., Random-Forest, Gradient-Boosting, Linear-SVM, etc.) where the training of these prediction models can either be static (e.g., fixed general models for all users, where the training is done toward device production) or dynamic (e.g., fine-tuning of the models during device lifetime, according to specific characters of the user use-cases). In one embodiment, several versions of prediction machine learning model parameters are provided (which can be approved during dual tests), and one or more of these pre-defined models can be chosen/configured during the data storage device's lifetime (e.g., according to dynamic tracking of the accuracy of the different models).

Any suitable indication ("feature") can be used indicate an expected power-loss occasion. Features that can be used as the input to an UGSD-prediction model include, but are not limited to, a portion of random/sequential read/write/flush commands in each of the last number (e.g., 1,000) of commands or in a fixed-length time window (command history), a command's length in the last command window, utilization of command queues in the last window (e.g., queue depth), averaged parameters (e.g., portion of read/write commands, command length, etc.), power consumption/single-root-input-output-virtualization (SRIOV) information (e.g., number of active SRIOVs), failure reporting (correctable and/or uncorrectable), link stability information, and temperature excursions.

Any suitable action can be taken in response to a provided power-loss event prediction (e.g., in response to the prediction exceeded a threshold reliability). For example, the machine-learning model can provide the probability rate for an upcoming power-loss event, and the controller 102 can configure its action accordingly by having several thresholds for this probability. The controller 102 can select among a plurality of proactive measures following a power-loss alert (beside just providing the firmware with an alert of an expected coming power-loss scenario). For example, based on the provided reliability score of a prediction, the controller 102 can perform one or more of the following to minimize and mitigate the upcoming power loss event: flush the cache, flush all internal tables, limit the cache size (based on the thresholds), limit the number of outstanding commands pending in the data storage device 100, limit the number of internal operations (e.g., garbage collection), and avoid sending completion messages to the host 300 before writing to the NAND 104.

Figure 4:
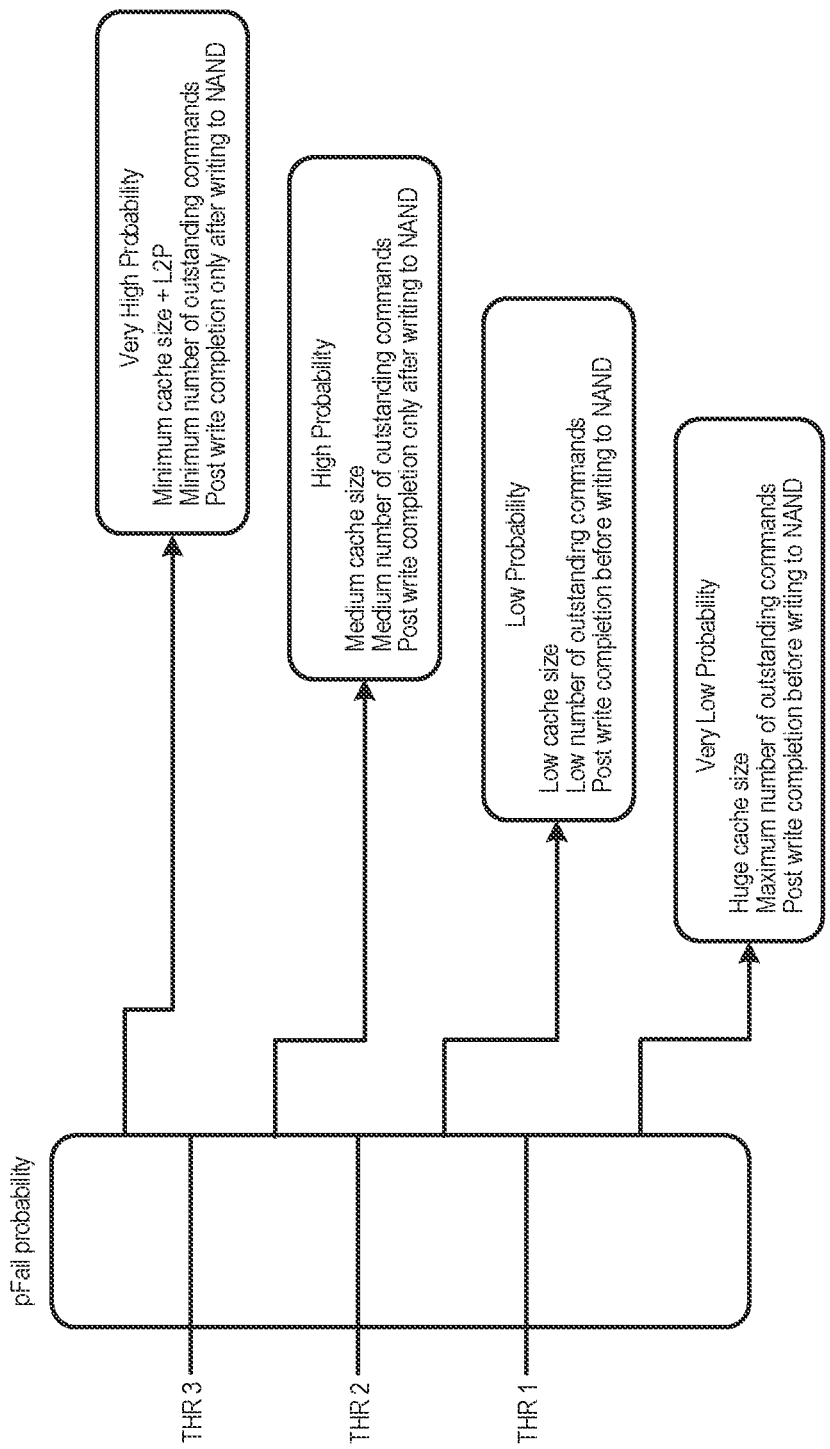
FIG. 4 is a diagram that illustrates power failure probability and several thresholds and actions of an embodiment.

FIG. 4 depicts one example of actions that can be taken based on power failure probability (pFail). In this example, three thresholds create four fail probability ranges. Below Threshold 1 is a very-low probability, so a large cache size, a maximum number of outstanding commands, and post-write completion before writing to the non-volatile memory 104 can be used. Between Threshold 1 and Threshold 2 is a low probability, so a low cache size, a low number of outstanding commands, and post-write completion before writing to the non-volatile memory 104 can be used. Between Threshold 2 and Threshold 3 is a high probability, so a medium cache size, a medium number of outstanding commands, and post-write completion only after writing to the non-volatile memory 104 can be used. Above Threshold 3 is very-high probability, so a minimum cache size and logical-to-physical address table, a minimum number of outstanding commands, and a post-write completion only after writing to the non-volatile memory 104 can be used.

Figure 5:
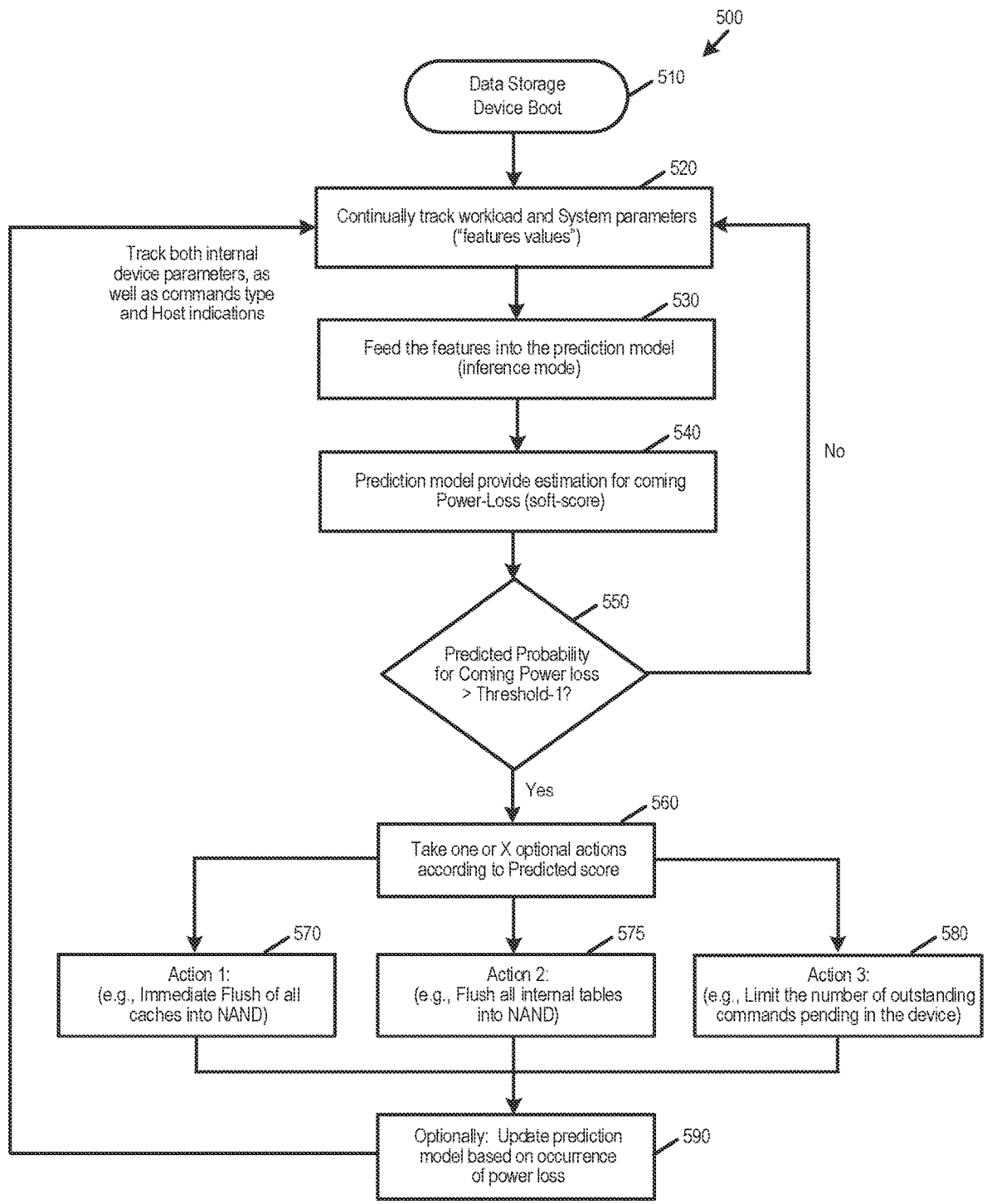
FIG. 5 is a flow chart of a method of an embodiment for prediction-based. handling of power loss in a data storage device.

FIG. 5 is a flow chart 500 of a method for prediction-based handling of power loss in the data storage device 100. As shown in FIG. 5, after the data storage device 100 boots (act 510), the controller 102 continually tracks workload and system preferences, which are referred to herein as "features values" (act 520). Next, the controller 102 feeds the features into a prediction model (inference mode) (act 530), which provides an estimate (soft score) from an upcoming power loss (act 540). The controller 102 then determines if the predicted probability is above a threshold (e.g., Threshold 1) (act 550). If it is, the controller 102 takes one or more actions according to the predicted score (act 560). Examples of some of these actions are shown in the flow chart 500, but it should be understood that these are merely examples, and other/different actions can be taken. These example actions include an immediate flush of all caches into the non-volatile memory 104 (act 570), flushing all internal tables into the non-volatile memory 104 (act 575), and limiting the number of outstanding commands pending in the data storage device 100 (act 580). Other actions can include, for example, a special notification to firmware and a sudden changing of occupied RAM sizes. The controller 102 can also optionally update the prediction model based on the occurrence of a power loss (act 590).

There are several advantages associated with these embodiments. For example, these embodiments can be used to reduce the cost of the data storage device 100 by reducing the size of capacitors and reducing DRAM caches utilization, which are both used to support PLP. These embodiments can also provide the advantage of reducing the time from power failure to flush completion.

There are several alternatives that can be used with these embodiments. For instance, in the above examples, power-loss-event prediction was used in the data storage device to provide cost savings and latency reduction by reducing the size of PLP capacitors and shortening the time duration between power failure until flush completion based on an early prediction notification. However, other types of data storage devices, such as USB memory devices, can benefit from power-loss-event prediction. Operation instructions of USB devices may require manual notification to the user before ejection of the USB drive to allow safe ejection of the drive and avoid data loss. By using prediction of an upcoming drive ejection, the requirement for such manual notification before ejecting the drive can be mitigated. Based on a "soft-measure" of prediction rates, the requirement for manual ejection notification can either by omitted or be limited to specific user scenarios at which an explicit notification will be used to instruct the user before USB drive ejection. Also, a UGSD in a USB drive may be able to be predicted with strong reliability. For example, a typical use case of a USB drive is to copy the contents of a large folder, after which the user will often disconnects the USB drive. Such a copying operation can, therefore, be a reliable predictor of a UGSD. Providing large data sets of extracted features and documentation of UGSD events can allow for much more complicated combinations of indications to be learned over time. Additionally, the hit-rate (i.e., the success rate of the prediction model) can be tracked, and, based on that tracked hit rate, the model can be updated and/or the reliability of the prediction can be indicated to the controller 102, which can use the hit-rate score together with the predicted probability to decide what countermeasures should be taken.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that, each element is individually accessible. By way anon-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a non-volatile memory;
   a volatile memory configured to cache data to be stored in the non-volatile memory; and
   a processor configured to:
   predict a probability of an ungraceful shutdown of the data storage device, wherein the ungraceful shutdown of the data storage device comprises an unscheduled loss of power from a host to the data storage device, which results in loss of data cached in the volatile memory;
   determine whether the probability is greater than a threshold;
   in response to determining that the probability is not greater than the threshold:
      use a first amount of the volatile memory to cache data to be written in the non-volatile memory; and
      send a write completion message to the host before writing the data to the non-volatile memory; and
   in response to determining that the probability is greater than the threshold, reduce a risk of data loss in the volatile memory that would occur in response to the ungraceful shutdown of the data storage device by:
      using a second amount of the volatile memory to cache the data to be written in the non-volatile memory, wherein the second amount is less than the first amount and
      sending the write completion message to the host after writing the data to the non-volatile memory.

2. The data storage device of claim 1, wherein the processor is further configured to use a machine-learning prediction model to predict the probability.

3. The data storage device of claim 2, wherein at least one of the following is used as an input to the machine-learning prediction model: a number of random/sequential read/write/flush commands, command length, utilization of command queues, power consumption, single-root-input-output-virtualization (SRIOV) information, failure reporting, link stability information, temperature excursions, failure notification, and host unmounts.

4. The data storage device of claim 2, wherein:
   the data storage device is configured to store a plurality of machine-learning prediction models; and
   the processor is further configured to select the machine-learning prediction model from the plurality of machine-learning prediction models.

5. The data storage device of claim 2, wherein the processor is further configured to update the machine-learning prediction model.

6. The data storage device of claim 1, wherein the processor is further configured to reduce the risk of data loss by performing at least one of the following: flushing a cache, flushing an internal table, limiting a number of outstanding pending commands, and limiting a number of internal operations.

7. The data storage device of claim 1, wherein the processor is further configured to:
   compare the probability against a plurality of thresholds; and
   select one of a plurality of actions to take to reduce the risk of data loss based on the comparison.

8. The data storage device of claim 1, further comprising a capacitor configured to provide the data storage device with power in response to the ungraceful shutdown of the data storage device.

9. The data storage device of claim 1, wherein the data storage device comprises a universal serial bus (USB) device.

10. The data storage device of claim 1, wherein the memory comprises a three-dimensional memory.

11. A method comprising:
    performing the following in a data storage device comprising a non-volatile memory and a volatile memory configured to cache data to be stored in the non-volatile memory:
    generating a prediction score of an ungraceful shutdown of the data storage device, wherein the ungraceful shutdown of the data storage device comprises an unscheduled loss of power from a host to the data storage device, which results in loss of data cached in the volatile memory;
    determining whether the prediction score is greater than a threshold;
    in response to determining that the prediction score is not greater than the threshold:

using a first amount of the volatile memory to cache data to be written in the non-volatile memory; and
sending a write completion message to the host before writing the data to the non-volatile memory; and
in response to determining that the prediction score is greater than the threshold, limiting an amount of data in the volatile memory at risk of loss due to the power being removed from the data storage device by:
using a second amount of the volatile memory to cache the data to be written in the non-volatile memory, wherein the second amount is less than the first amount and
sending the write completion message to the host after writing the data to the non-volatile memory.

12. The method of claim 11, wherein the prediction score is generated using a machine-learning prediction model.

13. The method of claim 12, wherein at least one of the following is used as an input to the machine-learning prediction model: a number of random/sequential read/write/flush commands, command length, utilization of command queues, power consumption, single-root-input-output-virtualization (SRIOV) information, failure reporting, link stability information, temperature excursions, failure notification, and host unmounts.

14. The method of claim 12, further comprising selecting the machine-learning prediction model from a plurality of machine-learning prediction models.

15. The method of claim 12, further comprising updating the machine-learning prediction model.

16. The method of claim 11, wherein limiting the amount of data at risk of loss comprises at least one of the following: flushing a cache, flushing an internal table, limiting a number of outstanding pending commands, and limiting a number of internal operations.

17. The method of claim 11, further comprising:
comparing the prediction score against a plurality of thresholds; and
selecting one of a plurality of actions to take to limit the amount of data at risk of loss based on the comparison.

18. The method of claim 11, wherein the data storage device further comprises a capacitor configured to provide the data storage device with power in response to the ungraceful shutdown of the data storage device.

19. The method of claim 11, wherein the data storage device comprises a universal serial bus (USB) device.

20. A data storage device comprising:
a non-volatile memory;
a volatile memory configured to cache data to be stored in the non-volatile memory;
means for predicting a probability of an ungraceful shutdown of the data storage device, wherein the ungraceful shutdown of the data storage device comprises an unscheduled loss of power from a host to the data storage device; and
means for limiting an amount of data loss that would occur in the volatile memory during the ungraceful shutdown in response to the probability being greater than a threshold by:
using a smaller amount of the volatile memory to cache the data to be written in the non-volatile memory as compared to when the probability is not greater than the threshold; and
sending a write completion message to the host after writing the data to the non-volatile memory, wherein the write completion message is sent to the host before writing the data to the non-volatile memory when the probability is not greater than the threshold.

* * * * *